UNITED STATES PATENT OFFICE.

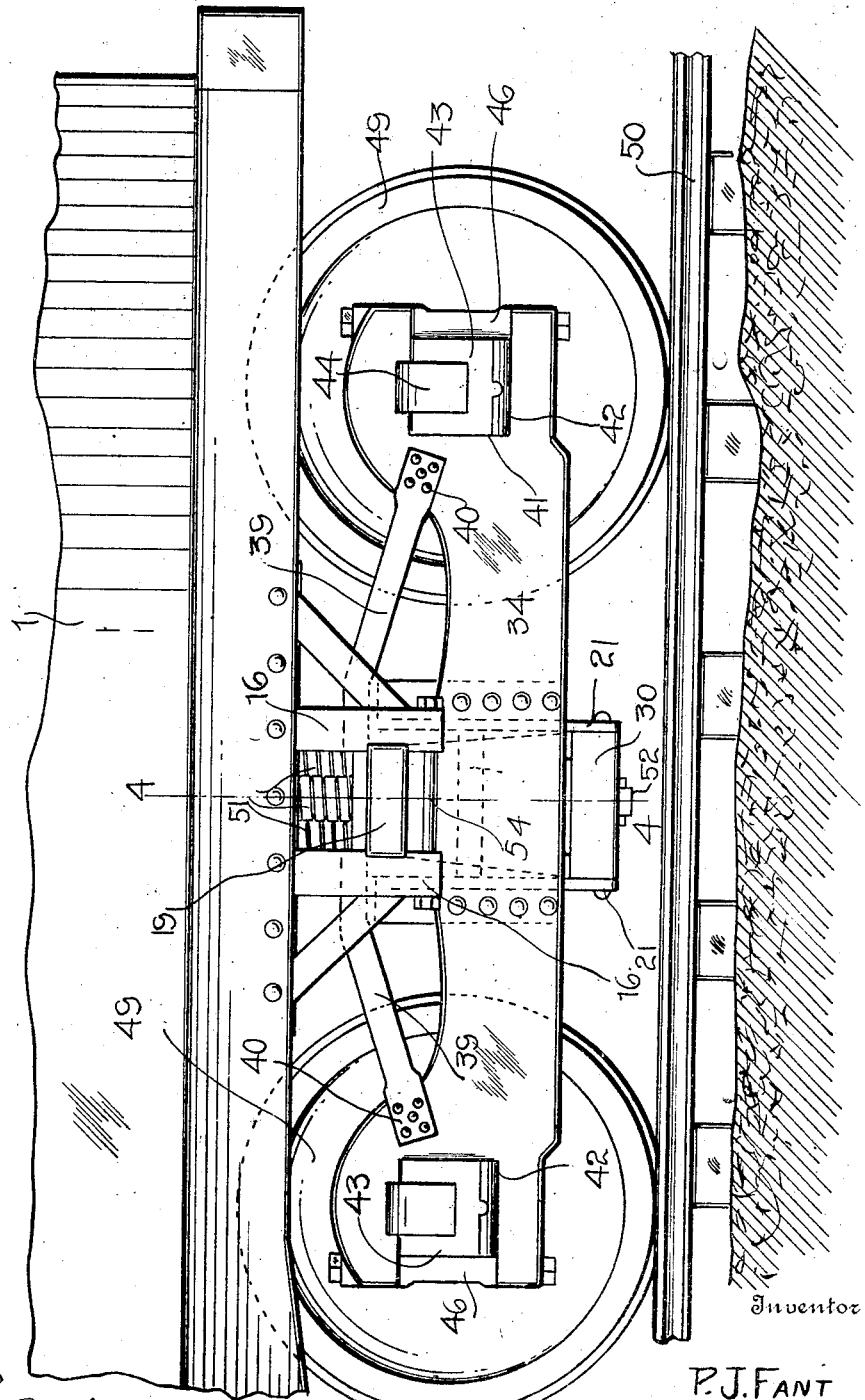

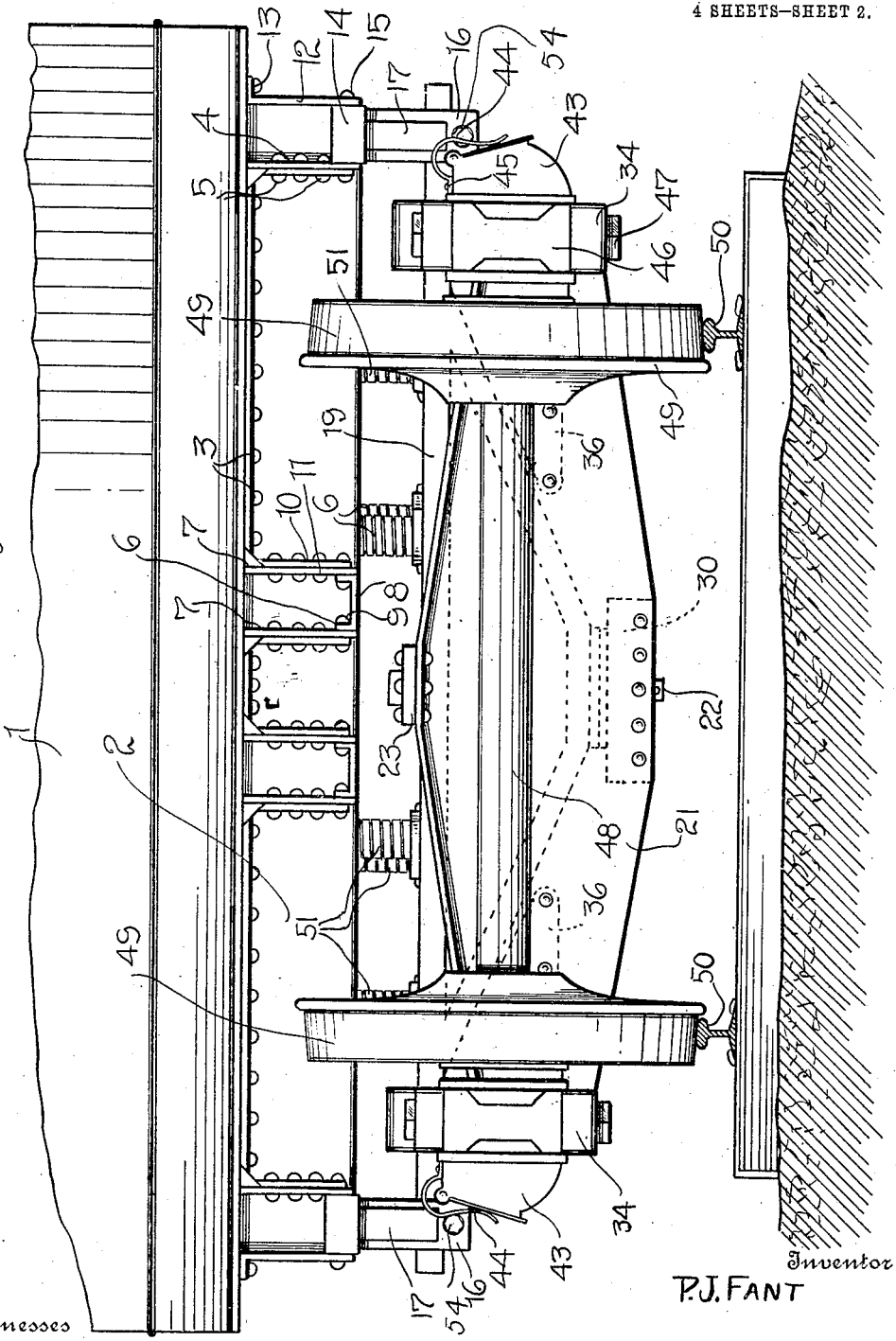

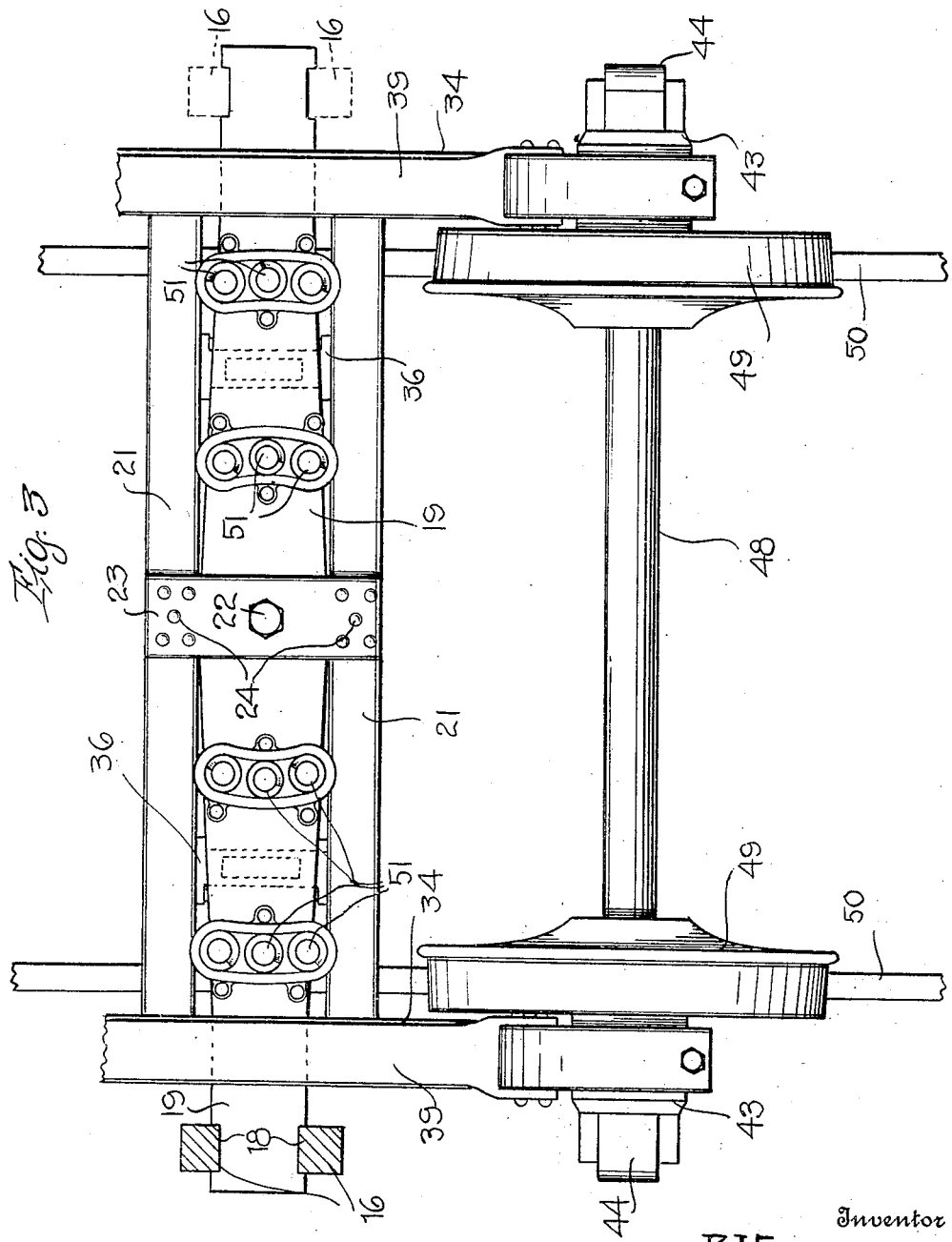

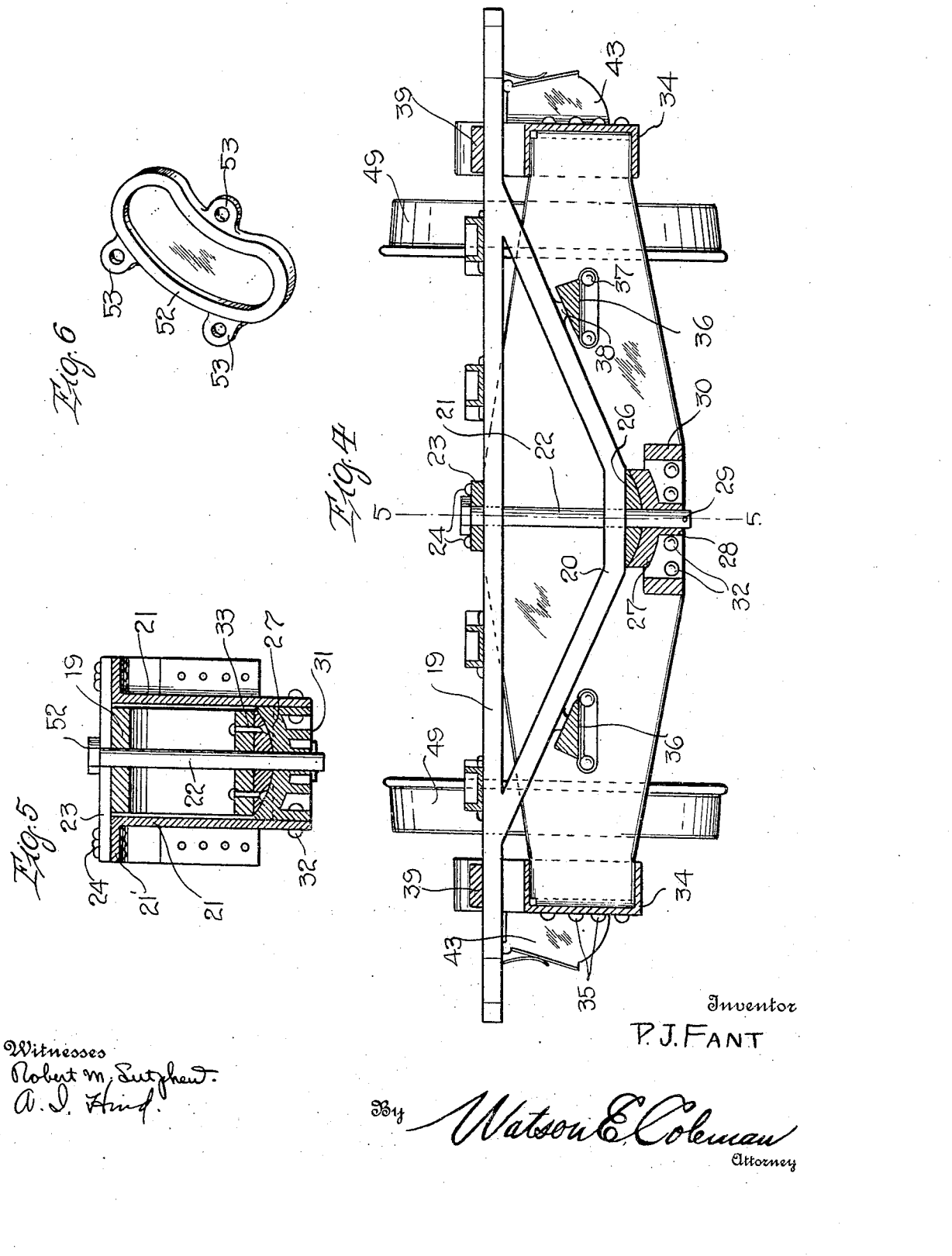

PATRICK J. FANT, OF HUGO, OKLAHOMA.

CAR-TRUCK.

1,094,708.

Specification of Letters Patent. Patented Apr. 28, 1914.

Application filed August 27, 1913. Serial No. 786,977.

*To all whom it may concern:*

Be it known that I, PATRICK J. FANT, a citizen of the United States, residing at Hugo, in the county of Choctaw and State of Oklahoma, have invented certain new and useful Improvements in Car-Trucks, of which the following is a specification, reference being had to the accompanying drawings.

This invention comprehends certain new and useful improvements in railway equipment and relates more specifically to car trucks.

An object of the invention is to provide an improved form of car truck especially adapted for freight cars and which is constructed in such manner as to allow proper movement of the car in each direction to permit the car to readily round the curve and enter or leave the switches of the track.

A further object resides in providing a truck constructed and attached to the car body in such manner as to remain secured to the latter when said body is turned over.

A still further object is the provision of a car truck which is simple in construction, inexpensive to manufacture, and highly efficient as well as strong and durable in use.

With the above and other objects in view, my invention consists in certain novel constructions, combinations, and arrangements of parts to be hereinafter more fully described, claimed, and illustrated in the accompanying drawings, in which—

Figure 1 is a side elevation of a truck applied to an ordinary car body; Fig. 2 is a rear elevation thereof; Fig. 3 is a rear elevation thereof, the car body being removed and a portion of the truck broken away; Fig. 4 is a vertical transverse section on the line 4—4 of Fig. 1; Fig. 5 is a vertical detail transverse section on the line 5—5 of Fig. 4; and Fig. 6 is a slightly enlarged detail perspective view of one of the spring receiving cups removed.

Referring more specifically to the drawings, in which similar reference characters designate corresponding parts throughout the several views, 1 designates a car body of conventional form to the bottom of which is secured the upper bolster 2 extending transversely beneath the car and formed of channel iron, the longitudinal edges of the same being turned outwardly in opposite directions, and bolted to the bottom of the car, as shown at 3. It will be understood that the ends of the upper bolster 2 stop short of the sides of the car and have the vertical edges thereof directed outwardly at right angles and bolted to the outer longitudinal brace members 4, as shown at 5. The vertical portions of the upper bolster 2 have recesses formed therein to accommodate the central longitudinal brace members 6 extended therethrough and secured to the bottom of the car in any suitable manner, said central longitudinal brace members consisting of vertical plates 7 connected at their lower ends by the horizontal channel members 8, bolted thereto, as shown at 9. The upper bolster 2 has outwardly directed flanges 10 at the vertical edges of the openings provided for the brace members 6 and the vertical plates of said brace members 6 are bolted to the flanges 10, as shown at 11.

It will be understood that the outer longitudinal brace members 4 are preferably in the form of vertical strips extending longitudinally of the car body near the sides thereof and the angle irons 12 have their short horizontal arms bolted to the bottom of the car, as shown at 13, while the long vertical arms thereof extend parallel with the vertical strips 4, it being understood that the angle irons 12 are positioned outwardly of the strips 4.

The angle irons 12 and strips 4 are suitably spaced from one another and an upper horizontal strip 14 is secured therebetween by rivets 15 or other suitable means, as clearly shown in Fig. 2. From the horizontal strip 14 depend a pair of vertical guide posts 16 which are braced by the inclined brace members 17 having their upper ends secured to the horizontal strip 14 while their lower ends are secured to the outer faces of the vertical guide posts 16, near the lower ends thereof. It will be understood that this construction is the same at either side of the car and the inner faces of the guide posts 16 to either side of the car are engaged in the recesses 18 in the vertical edges of the lower or truck bolster 19, near the end thereof, the ends of the lower or truck bolster 19 being engaged between the guide posts of each pair, as shown in Figs. 1 and 3.

The lower or truck bolster 19 decreases gradually in width from its center to its opposite ends as will be readily seen by referring to Fig. 3 and while said bolster is flat upon its upper face it has a depending central brace arm 20 beneath its main portion, the opposite ends of the arm 20 being connected with the main portion of the bolster 19, while the lowermost central portion of said arm is parallel with the main central portion of said bolster, as clearly shown in Fig. 4. The bolster 19 is positioned between the spaced parallel transverse truck frame members 21 and is mounted upon the king bolt 22 extended through the center of the main portion of said bolster and through the central or main portion of the arm 20, said king bolt being extended through the stationary arm 23 positioned transversely across the center of the bolster 19 and having its opposite ends bolted or otherwise secured to the upper outwardly directed edges 21' of the transverse truck frame members 21, as shown at 24. The king bolt 22 also passes through the bearing washer 26 engaged against the under face of the central portion of the arm 20 and having a convexed lower face engaged in the cup bearing 27 through the center and depending portion 28 of which the lower end of the king bolt extends, said king bolt having a transverse opening 29 in its lower extremity through which a cotter pin or the like may be engaged to prevent withdrawal of the king bolt, it being understood that said extremity depends below the depending portion 28 of the cup 27. The bearing cup 27 is preferably cast with its rectangular supporting member 30 which has the longitudinal reinforcing ribs 31 beneath the cup bearing 27, the opposite sides of the supporting member 30 being riveted or otherwise secured to the inner faces of the transverse truck frame members 21 at the lower central portions thereof, as shown at 32. It will be understood that the supporting member 30 with the bearing cup 27 formed therewith is positioned between the transverse truck frame members 21 and it will also be understood that the bearing washer 26 is preferably bolted to the central horizontal portion of the arm 20, as shown at 33, in Fig. 5.

The transverse truck frame members 21 are tapered upon their upper and lower faces toward the opposite ends of said members and the reduced ends are positioned in the longitudinal truck frame members 34 which are preferably formed of channel iron, as will be clearly understood by referring to Fig. 4. The vertical edges of the ends of the transverse truck frame members 21 are turned outwardly in opposite directions and bolted to the main portion of the longitudinal truck frame members 34, as shown at 35.

The transverse truck frame members 21 carry the stop plates 36 which have their opposite ends directed downwardly and bolted to the inner faces of the transverse truck frame members 21, as shown at 37, the stop members 36 being of substantially triangular form and having the stop lugs 38 formed on their upper faces and engaged against the lower face of the inclined portions of the arm 20 to form rests for the same and prevent the ends of the truck bolster 19 from moving downwardly. The ends of the truck bolster 19 are prevented from moving upwardly by the brace members 39 which have their central portions engaged transversely across said ends of the truck bolster 19, inwardly of the vertical guide posts 16, the opposite ends of said brace members 39 being directed downwardly and bolted to the enlarged ends of the longitudinal truck frame members 34, as shown at 40.

It will be seen that the opposite ends of the longitudinal truck frame members 34 are enlarged and provided with the usual recesses 41 for the axle boxings 42 having the hinged covers 43 resiliently retained in closed position by the springs 44 each of which has one end secured upon the top of the boxing, as shown at 45, while its central portion is curved over the hinged portion of the cover 43 and the free end of said spring rests against the cover 43 to retain the same in closed position. The axle boxings 43 are of the usual form and are secured in position by the castings 46 secured in the ends of the recesses 44 by the bolts 47 which pass longitudinally through said castings. The axle 48 has its opposite ends secured in the boxings 43 in the usual manner and the wheels 49 are mounted in the usual manner upon the axle 48 for engagement with the track rails 50.

The upper or car bolster 2 is resiliently retained in spaced relation with the lower or truck bolster 19 by the helical springs 51 which have their upper ends secured to the upper bolster 2 in any preferred manner while their lower ends are engaged in the arcuate bearing cups 52 which have the outwardly directed perforated ears 53 through which suitable securing members are engaged for securing said arcuate bearing cups upon the upper face of the truck bolster 19. It will be understood that the springs 51 are arranged in sets of three, one bearing cup being provided for the lower ends of each set, as clearly shown in Fig. 2. The car body is guided in its vertical movement by the guide posts 16, said posts preventing the lower or truck bolster 19 from turning independently of the upper or car body bolster 2 and the car body. Further, as the guide posts 16 are secured in the recesses 18, lateral movement of the car body and upper bolster 2 will be prevented. The truck will be permitted to turn in either direction upon the king bolt 22 when the car is rounding a curve, going onto a switch or side track or leaving the same to return to the main track. The guide posts 16 at each side of the truck are connected at their lower ends by a bolt 54, beneath the end of the lower truck or bolster 19, as will be clearly seen in Fig. 1.

From the foregoing it will be apparent that I have provided an improved car truck which will be strong and durable as well as highly efficient in use. It will further be apparent that all of the parts of the device are of extremely simple construction and should any of the same become worn or broken they may be readily replaced at a comparatively small cost without interfering with the other parts.

While I have shown the preferred embodiment of my car truck, it will be understood that minor changes in the details of construction may be made within the scope of the appended claims without departing from the spirit of my invention or sacrificing any of the advantages of the same.

What I claim is:—

1. A device of the class described comprising a truck frame, a truck bolster mounted in said frame, a king bolt carried by the frame and engaged through the bolster, said bolster being adapted to turn for a limited distance in either direction upon the king bolt, means carried by the frame for preventing vertical movement of the ends of the bolster, an upper bolster above the truck bolster, means for resiliently spacing the upper bolster from the truck bolster, means carried by the upper bolster and engaged with the truck bolster to prevent turning of the same independently of the upper bolster, axle supporting means carried by the truck frame, axles carried by the supporting means, and wheels mounted on said axles.

2. A device of the class described comprising a truck frame, a king bolt carried by the truck frame, a truck bolster pivotally mounted upon the king bolt, means for preventing upward movement of the ends of the truck bolster, means for preventing downward movement of the ends of the truck bolster, bearing means carried by the truck frame for the truck bolster, a car bolster above the truck bolster, guide posts depending from the opposite ends of the car bolster, arcuate bearing cups positioned upon the truck bolster and arranged concentrically of the king bolt, springs between the car bolster and the truck bolster, said springs having their lower ends engaged in the bearing cups while their upper ends are secured to the car bolster, axles carried by said truck frame, and wheels mounted upon said axles.

3. A device of the class described comprising a truck frame, including transverse and longitudinal members, means for connecting the transverse members, a king bolt carried by said means, a truck bolster mounted on said king bolt between the transverse truck frame members, said transverse truck frame members having their ends secured in the longitudinal truck frame members, bearing means for the truck bolster, means for preventing upward movement of the truck bolster, means for preventing downward movement of the truck bolster, a car bolster above the truck bolster, means for resiliently spacing the car bolster above the truck bolster, and guide means connected with the car bolster and engaged with the truck bolster to prevent independent movement of said bolsters.

4. A device of the class described comprising a truck frame including transverse and longitudinal frame members, said transverse frame members having their ends connected with the longitudinal frame members, means for connecting the transverse frame members, a king bolt carried by the connecting means, a truck bolster mounted on the king bolt between the transverse frame members, bearing means for the truck bolster carried by the transverse frame member connecting means, means carried by the transverse frame members for preventing downward movement of the ends of the truck bolster, means carried by the longitudinal frame members for preventing upward movement of the ends of the truck bolster, a car bolster positioned upon the truck bolster, springs carried by the car bolster, means carried by the truck bolster for receiving the lower ends of the springs, and guide members carried by the car bolster and engaged with the ends of the truck bolster to guide the car bolster in its vertical movement and prevent independent horizontal movement of said bolsters.

5. A device of the class described comprising a truck frame including connected transverse frame members and longitudinal frame members, means carried by the transverse frame members for supporting a bolster therebetween, a bolster mounted upon said means, said bolster being tapered toward its opposite ends and extended beyond the longitudinal frame members, means for preventing downward movement of the bolster, means for preventing upward movement of the bolster, a car bolster above the truck bolster, cushioning means between said bolsters, arcuate members carried by said truck bolster for holding the lower ends of the cushioning means, guide members, the ends of the truck bolster having recesses in their side edges, said guide members being engaged in said recesses, axle supporting means carried by the truck frame, axles mounted in said means, and wheels mounted upon said axles.

6. In a car truck mounting, a bolster mounted beneath the car, a truck frame mounted upon said bolster for pivotal movement in a horizontal plane, cushioning means arranged between the bolster and the bottom of the car, and means for preventing pivotal turning movement of the bolster with the truck frame.

7. In a car truck mounting, a bolster arranged beneath the car, a truck frame pivotally mounted centrally upon said bolster for limited turning movement in a horizontal plane with respect thereto, cushioning means interposed between the bolster and the bottom of the car to yieldably support the car, guides fixed to the car body in which the ends of said bolster are mounted, said guides preventing turning movement of the bolster with the truck frame, and additional means to prevent tilting movement of the truck frame with relation to said bolster.

8. In a car truck mounting, a transversely disposed bolster arranged beneath the car body, cushioning means interposed between said bolster and the bottom of the car to yieldably hold the same against relative vertical movement, means for guiding said bolster in its vertical movement, a truck frame centrally pivoted upon the bolster for turning movement in a horizontal plane, and slidably engaged means on the bolster and truck frame to prevent their relative transverse tilting movement.

9. In a car truck mounting, a transversely disposed bolster arranged beneath the car, cushioning means interposed between said bolster and the bottom of the car to yieldingly hold the same against relative vertical movement, a truck frame including parallel transverse members, a pivot bearing centrally arranged between said members, said bolster being mounted upon said bearing whereby said truck frame has limited pivotal movement in a horizontal plane with respect to the bolster, guide means for the bolster holding the same against turning movement with the truck frame, and slidably engaged means on the bolster and the transverse frame members upon opposite sides of the pivot bearing to prevent transverse tilting movement of the bolster and frame with respect to each other.

In testimony whereof I hereunto affix my signature in the presence of two witnesses.

PATRICK J. FANT.

Witnesses:
E. P. SNEAD,
J. M. WILLIS.